United States Patent [19]

Brookshire

[11] Patent Number: 5,616,841
[45] Date of Patent: Apr. 1, 1997

[54] FLOW METERING DEVICE FOR LANDFILL GAS EXTRACTION WELL

[75] Inventor: Ronald L. Brookshire, El Cajon, Calif.

[73] Assignee: Landfill Gas & Environmental Products, Inc., Santee, Calif.

[21] Appl. No.: 646,039

[22] Filed: May 7, 1996

[51] Int. Cl.$^6$ .............................. F15D 1/02; G01N 7/14; G01F 1/34; F16L 55/10
[52] U.S. Cl. .................. 73/152.29; 73/152.01; 73/152.18; 73/195; 73/861.42; 73/861.62; 73/861.64; 138/44; 364/510; 285/93; 285/119
[58] Field of Search ................. 73/152.01, 152.18, 73/152.23, 152.29, 61.45, 54.16, 54.41, 54.42, 195, 861.61, 861.62, 861.63, 861.64; 166/250; 374/16, 17, 20; 138/40, 44, 45, 46; 285/93, 119

[56] References Cited

U.S. PATENT DOCUMENTS

| | | | |
|---|---|---|---|
| 1,145,234 | 7/1915 | Dodge | 73/213 |
| 1,904,333 | 4/1933 | Smith, Jr. | 137/75 |
| 2,197,214 | 4/1940 | Hollander | 73/213 |
| 2,379,138 | 6/1945 | Fitting, Jr. et al. | 73/155 |
| 2,487,083 | 11/1949 | Warshaw | 73/211 |
| 2,564,272 | 8/1951 | Morton | 73/211 |
| 3,326,041 | 6/1967 | Reed | 73/213 |
| 4,026,355 | 5/1977 | Johnson et al. | 166/246 |
| 4,080,837 | 3/1978 | Alexander, et al. | 73/61.1 R |
| 4,236,406 | 12/1980 | Reed et al. | 73/61.1 R |
| 4,403,514 | 9/1983 | Osborn | 73/861.42 |
| 4,507,552 | 3/1985 | Roesner et al. | 250/259 |
| 4,528,847 | 7/1985 | Halmi | 73/195 |
| 4,557,296 | 12/1985 | Byrne | 138/44 |
| 4,562,744 | 1/1986 | Hall et al. | 73/861.02 |
| 4,726,221 | 2/1988 | Tavlarides et al. | 73/61.1 R |
| 4,757,709 | 7/1988 | Czernichow | 73/155 |
| 4,799,388 | 1/1989 | Hunter | 73/861.63 |
| 4,825,704 | 5/1989 | Aoshima et al. | 73/861.42 |
| 4,884,460 | 12/1989 | Nowacki et al. | 73/861.52 |
| 4,890,672 | 1/1990 | Hall | 166/250 |
| 4,896,541 | 1/1990 | Hughes | 73/861.22 |
| 4,915,135 | 4/1990 | Kellenbarger et al. | 138/44 |
| 4,932,269 | 6/1990 | Cammarata, III et al. | 73/861.61 |
| 4,974,452 | 12/1990 | Hunt et al. | 73/861.64 |
| 5,121,658 | 6/1992 | Lew | 73/195 |
| 5,379,650 | 1/1995 | Kofoed et al. | 73/861.52 |
| 5,388,456 | 2/1995 | Kettel | 73/152 |
| 5,396,931 | 3/1995 | Gawlik | 138/44 |
| 5,458,006 | 10/1995 | Roqueta | 73/861.42 |

Primary Examiner—Hezron E. Williams
Assistant Examiner—J. David Wiggins
Attorney, Agent, or Firm—John L. Rogitz

[57] ABSTRACT

A metering pipe for a landfill well includes an upstream segment and a downstream segment. A coupling having an orifice plate positioned therein surroundingly engages both segments. Specifically, the segments are advanced into the coupling toward each other, on opposite sides of the orifice plate from each other. Upstream and downstream pressure ports are respectively formed through the walls of the upstream and downstream segments and the coupling adjacent the orifice plate. The difference in pressure at the ports is correlated to a flow rate through the pipe. To ensure that all gas flowing through the well also flows through the metering pipe, a compression coupling is disposed between the metering pipe and well. The compression coupling joins the metering pipe to the well and blocks gas flow past the outside of the metering pipe, while permitting the metering pipe to be selectively reciprocated relative to the well.

20 Claims, 3 Drawing Sheets

FLOW METERING DEVICE FOR LANDFILL GAS EXTRACTION WELL

FIELD OF THE INVENTION

The present invention relates generally to landfill metering devices, and more particularly to devices for measuring the flow of gases from landfills through gas extraction wells.

BACKGROUND

Waste products decompose in landfills, and after the free oxygen in the landfill is depleted, the waste product decomposition generates methane gas. It is desirable to recover this methane gas for environmental and safety reasons, and because subsequent to recovery the gas can be used as a source of energy.

Accordingly, systems have been developed to extract the methane. One such system is disclosed in U.S. Pat. No. 5,458,006, which discloses that its system and other such systems typically include a plurality of vertical pipes, referred to as "well casings", that are vertically advanced at various locations into the landfill. The well casings are perforated along their lower-most segment, so that gas from the landfill can enter the casings. A network of horizontal pipes on or near the surface of the landfill interconnects the well casings, with a source of vacuum being in fluid communication with the network of horizontal pipes to evacuate the network and, hence, to evacuate methane gas from the well casings.

It happens that as methane gas is evacuated from a landfill, oxygenated air seeps back in. To avoid adversely affecting the generation of methane, however, the rate of oxygen inflow to the landfill must be controlled. Stated differently, to ensure continued methane gas production, the rate of gas extraction from the landfill and, thus, the rate of oxygen inflow to the landfill must be established to remain below a predetermined flow rate.

Not surprisingly, the methane gas extraction systems mentioned above typically provide for measuring gas flow rate through the well casings. In response to the measured rate, valves in the systems can be manipulated as appropriate to establish a desired flow rate through the well casings.

Several methods exist for measuring gas flow through the well casings. These methods typically involve measuring gas flow through a metering pipe that is in fluid communication with the well casing. One method simply involves measuring pressure at two points of the metering pipe that are longitudinally separated from each other. As is well understood, pressure head is inevitably lost in a pipe between an upstream location and a downstream location, with the magnitude of the pressure head loss being related to the gas flow rate through the pipe. Consequently, the pressure differential between any two longitudinally-spaced points in a pipe can be measured and then correlated to a gas flow rate.

Other methods for measuring gas flow rates through metering pipes include disposing an obstruction such as a an orifice or a pitot tube in the pipe and then measuring the pressure differential across the orifice or at the taps of the pitot tube. The pressure differentials are then correlated to gas flow rates in accordance with widely understood principles. The use of orifices advantageously permits the use of relatively short metering pipes, vis-a-vis metering pipes which simply measure head loss.

With particular regard to orifices, the '006 patent mentioned above teaches a metering pipe having an upstream segment and a downstream segment, with the segments being joined by a pipe coupler and with only the uppermost end of the downstream segment protruding through a bushing above the well casing. The remainder of the metering pipe, including an orifice used to generate pressure signals for calculating flow rate, is located in the well casing. As contemplated by the '006 patent, the metering pipe segments are made of polyvinylchloride (PVC), and the coupler is a PVC coupler formed with an internal ridge against which the pipe segments are advanced. The orifice is formed in a separate disc-shaped orifice plate made of plastic or steel which is sandwiched between the ridge of the coupling and one of the pipe segments. Thus, flow through the pipe does not encounter only a flat disc-shaped planar surface of an orifice plate, but the orifice plate circumscribed by the ridge of the coupling which rises from the plane of the plate. The combined effect of the ridge and plate can cause flow turbulence and thus decreased measurement accuracy.

Not surprisingly, therefore, the '006 patent teaches that the pressure taps which are formed in the metering pipe segments upstream and downstream of the orifice must be longitudinally distanced from the orifice plate by distances that are multiples of the diameter of the metering pipe, to ensure accurate flow rate measurement. For this reason, pressure lines must extend through the bushing located along the well casing, requiring modification of the bushing and rather elaborate pressure line-bushing fittings to ensure that gas does not leak between the pressure lines and bushing. As a further undesirable result, it will readily be appreciated that such a structure inhibits easily raising or lowering the metering pipe as might be required, e.g., to compensate for well casing settling. Like the '006 patent, U.S. Pat. No. 4,562,744 to Hall et al. teaches that pressure sensors in an orifice meter must be distanced from the orifice plate such that "minimum swirl or turbulence exists". As recognized by the present invention, however, a metering pipe orifice plate in combination with an internally ridged PVC coupling need not create turbulence. Further, the present invention recognizes that upstream and downstream pressure taps in a metering pipe containing an orifice need not be distanced from the orifice, but may be formed adjacent the orifice, thereby simplifying construction and design of the flow metering device while still ensuring accurate flow measurement.

Accordingly, it is an object of the present invention to provide a flow metering device for a landfill well that accurately measures gas flow through the well. Another object of the present invention is to provide a flow metering device for a landfill well that includes an orifice plate which cooperates with a pipe coupling. Still another object of the present invention is to provide a flow metering device for a landfill well which is easy to use and cost-effective.

SUMMARY OF THE INVENTION

A metering pipe system is disclosed which is positionable in fluid communication with a well in a landfill for determining gas flow rate through the well. As disclosed in detail herein, the metering pipe includes an upstream pipe segment and a downstream pipe segment that is oriented coaxially with the upstream pipe segment. A metering coupling joins the segments.

In accordance with the present invention, the metering coupling defines an upstream opening, a downstream opening, and a fluid passageway extending between the openings.

A ridge circumscribes the fluid passageway, and the ridge defines a first face and a second face. An orifice plate is formed with an orifice and defines first and second faces respectively oriented in the same direction of fluid flow as are the first and second faces of the ridge. As disclosed further below, the orifice plate is positioned in the fluid passageway against the ridge and is configured such that the first face of the orifice plate is coplanar with the first face of the ridge. The upstream pipe segment is surroundingly engaged by the coupling, and the upstream segment extends substantially from the orifice plate to beyond the upstream opening. Likewise, the downstream pipe segment is surroundingly engaged by the coupling and extends substantially from the orifice plate to beyond the downstream opening. Upstream and downstream pressure sensors are positioned externally to the coupling in fluid communication with the fluid passageway upstream and downstream, respectively, of the orifice plate.

Preferably, an upstream pressure port is formed between the upstream pressure sensor and the fluid passageway upstream of the orifice plate. Advantageously, the upstream pressure port is closely juxtaposed to the orifice plate. Moreover, a downstream pressure port is formed between the downstream pressure sensor and the fluid passageway downstream of the orifice plate. Like the upstream pressure port, the downstream pressure port is closely juxtaposed to the orifice plate.

In one presently preferred embodiment, the coupling defines an axis, and each pressure port includes a respective pressure channel that is formed in the coupling. Each pressure channel defines an oblique angle with respect to the axis. Also, the orifice includes an upstream section having a cylindrical wall and a downstream section contiguous to the upstream section. Unlike the upstream section, however, the downstream section has a frusto-conical wall that is flared outwardly from the upstream section.

In addition to the novel metering coupling, the system includes a compression fitting for selectively holding the metering pipe stationary relative to a casing of the well. The preferred compression fitting includes a base that is stationarily connected to the well casing. The base defines a seating surface, and a resilient compression ring is positioned against the seating surface in a surrounding relationship with the metering pipe. Per the present invention, the compression ring is biased to a slide configuration, wherein the compression ring substantially does not contact the metering pipe and the metering pipe can be reciprocated relative to the well casing. Additionally, the compression ring is deformable to a grip configuration, wherein the compression ring is urged against the metering pipe to substantially prevent relative motion between the metering pipe and the well casing. A compression collar is movably engaged with the base between a first position, wherein the compression collar is distanced from the compression ring, and a second position, wherein the compression collar urges the compression ring into the grip configuration.

In a particularly preferred embodiment of the compression fitting, the base includes a hollow bushing defining a channel. A compression pipe is bonded to the bushing in the channel. The compression pipe is externally threaded, and the compression collar is internally threaded for threadably engaging the compression pipe. The system can further include a blower and a plurality of wells in fluid communication with the blower for extracting gas from the landfill.

In another aspect of the present invention, a coupling is disclosed for joining first and second pipe segments that are coaxially aligned with each other. The coupling includes a first cylindrical receptacle for receiving the first segment therein. Also, the coupling includes a second cylindrical receptacle for receiving the second segment therein, such that the first and second receptacles are coaxially opposed to each other. An orifice plate separates the receptacles and defines an orifice, such that fluid in the first pipe can pass through the orifice to the second pipe. Additionally, a first pressure sensor channel is formed through the first receptacle and is closely juxtaposed with the orifice plate, while a second pressure sensor channel is formed through the second receptacle and is juxtaposed with the orifice plate.

In still another aspect, an apparatus is disclosed for collecting gas from the ground. The apparatus includes a blower for generating a negative pressure gradient, and a plurality of well casings for drawing gas from a plurality of localized areas in the ground to the surface. The apparatus further includes a network of lateral pipes for connecting the well casings to the blower, thereby collecting gas from the well casings using the negative pressure gradient of the blower. For each well casing, a metering system is provided for monitoring the flow rate in the well casing. Each metering system includes a metering pipe extending along at least part of its length within the well casing. Moreover, each metering pipe includes an orifice plate defining an orifice and first and second pressure sensors for sensing pressure at first and second points of the metering pipe. As envisioned by the present invention, the points are located on opposite sides of the orifice plate from each other and are closely juxtaposed with the orifice plate.

In yet another aspect of the present invention, a compression fitting is disclosed for selectively holding a landfill component, such as a metering pipe or a flexible membrane, stationary relative to a well casing in a landfill. The compression fitting includes a base that is engaged with well casing, with the base defining a seating surface. A resilient compression ring is positioned against the seating surface in a surrounding relationship with the component. The compression ring is biased to a slide configuration, wherein the compression ring substantially does not contact the component and the component can be reciprocated relative to the well casing. Also, the compression ring is deformable to a grip configuration, wherein the compression ring is urged against the component to substantially prevent relative motion between the component and the well casing. A compression collar is movably engaged with the base between a first position, wherein the compression collar is distanced from the compression ring, and a second position, wherein the compression collar urges the compression ring into the grip configuration.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
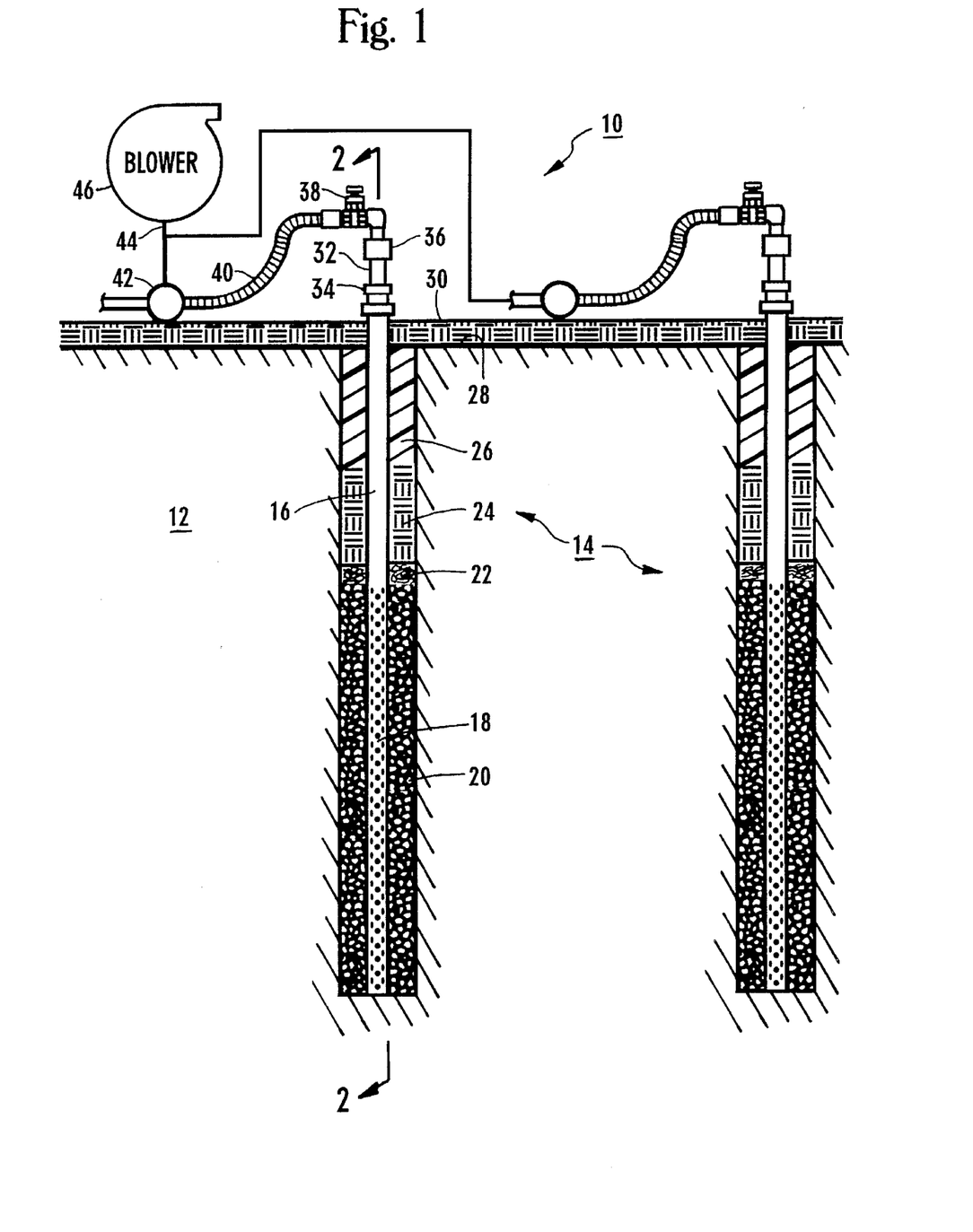
FIG. 1 is a side view of a landfill gas recovery system, showing two wells and showing lateral pipes and the blower schematically.

Referring initially to FIG. 1, a system is shown and generally designated 10 for recovering methane gas from a landfill 12. As shown, the system 10 includes a plurality of wells 14, each including a respective vertically-oriented well casing 16. Each well casing 16 can advantageously be made of four inch or six inch diameter polyvinylchloride piping (4" or 6" PVC) that has a lower perforated segment 18 surrounded by washed gravel 20. Other size pipe, however, and other materials, e.g., high density polyethylene (HDPE), fiberglass, or steel, may be used.

Above the washed gravel 20 and lower perforated segment 18, each well casing 16 can be advantageously surrounded by a six inch high collar 22 made of fiberglass wool. Above the fiberglass wool collar 22, each well casing 16 is surrounded by dirt backfill 24, on top of which can be deposited a layer 26 of bentonite seal. A sealing membrane 28 can be placed on top of the bentonite seal layer 26 just below ground level 30.

As shown in FIG. 1 and described in greater detail below, a respective metering pipe 32 extends out of each well casing 16 and is coupled thereto by a respective compression fitting 34. Gas flow rate through each metering pipe 32 (and, hence, through the respective well casing 16) is measured by a metering coupling 36 with associated instrumentation. As can be appreciated in reference to FIG. 1, each compression fitting 34 and metering coupling 36 is positioned above ground, external to the associated well casing 16, to thereby afford convenient access to these components.

Based on the gas flow rate through a well casing 16 as indicated by the metering instrumentation associated with the particular casing 16, a respective flow control throttle valve 38 can be manipulated as appropriate to establish a desired gas flow rate. A respective flexible hose 40 connects each valve 38 to a laterally-oriented connector pipe 42, and thence to a lateral pipe system 44. An air blower 46 is in fluid communication with the lateral pipe system 44 for evacuating the pipe system 44 and, consequently, to evacuate gas out of the landfill 12. In other words, the blower 46 establishes a negative pressure gradient from the landfill 12 to the blower 46 to recover methane gas from the landfill 12.

Figure 2:
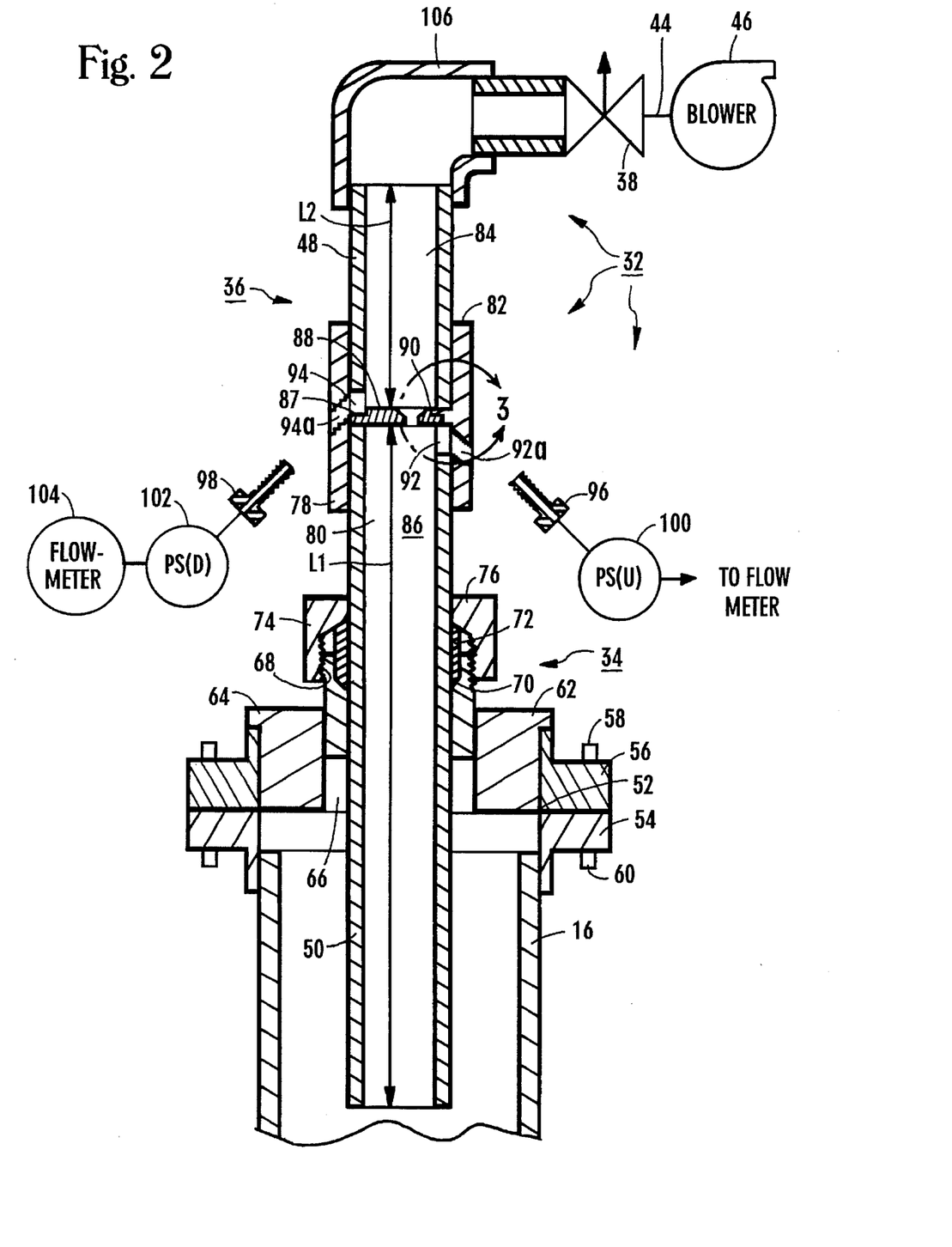
FIG. 2 is a cross-sectional view as seen along the line 2—2 in FIG. 1, with the lower portion of the well casing broken away, with the pressure connectors shown in an exploded relationship with the metering coupling, and with the flow control valve, blower, pressure sensors, and flow meter shown schematically.

Turning now to FIG. 2, the details of the presently preferred metering pipe 32 can be seen. As shown, the metering pipe 32 includes a downstream vertically-oriented PVC pipe segment 48 coaxially opposed to an upstream vertically-oriented PVC pipe segment 50. Both segments 48, 50 are of equal diameter to each other, with the diameter of the metering pipe 32 being slightly smaller than the diameter of the well casing 16. Consequently, the upstream segment 50 can be positioned coaxially in the well casing 16, with a portion of the upstream segment 50 protruding above the well casing 16. Preferably, the length L1 of the upstream segment 50 is about ten times the diameter of the segment 50, while the length L2 of the downstream segment 48 is about three to five times the diameter of the segment 48.

FIG. 2 shows that the compression fitting 34 includes a base 52 that is stationarily connected to the well casing 16. Preferably, the base 52 includes a lower base flange 54 that is attached to the well casing 16 by means well-known in the art, e.g., by adhesive bonding. An upper base flange 56 is fixedly engaged with the lower base flange 54 by a plurality of bolts 58 and associated nuts 60.

Additionally, the base 52 includes a rigid annular PVC reducer bushing 62. The reducer bushing 62 is formed with an upper flange 64 that rests on the upper base flange 56 as shown. Also, the bushing 62 defines a channel 66, and a hollow cylindrical PVC compression pipe 68 is bonded to the bushing 62 in the channel 66. For purposes to be shortly disclosed, the compression pipe 68 is externally threaded.

FIG. 2 shows that the compression pipe 68 is formed on its inner surface with an annular seating surface 70. As shown, the seating surface 70 is not oriented perpendicularly to the axis of the compression pipe 68, but is rather oriented at an oblique angle thereto.

A resilient, deformable, plastic or rubber annular compression ring 72 is positioned against the seating surface 70 in a surrounding relationship with the upstream segment 50 of the metering pipe 32. The edge of the compression ring 72 that is positioned against the seating surface 70 (i.e., the bottom edge of the compression ring 72) is bevelled at the same angle relative to the axis of the compression pipe 68 as the seating surface 70.

In accordance with the present invention, the compression ring 72 is materially biased to a slide configuration, wherein the compression ring 72 does not hold the upstream segment 50. In the slide configuration, the upstream segment 50 can be reciprocated relative to the well casing 16. Moreover, the compression ring 72 is deformable to a grip configuration, wherein the compression ring 72 is urged against the upstream segment 50 to substantially prevent relative motion between the upstream segment 50 and the well casing 16. In other words, in the grip configuration the compression ring 72 holds the upstream segment 50 in an interference fit such that the upstream segment 50 cannot easily be moved in the well casing 16 by hand.

To move the compression ring 72, an annular rigid PVC compression collar 74 is internally threaded as shown for threadably engaging the compression pipe 68 and urging against the top edge of the compression ring 72. Like the bottom edge of the compression ring 72, the top edge is bevelled, as shown. In the preferred embodiment, the compression collar 74 is formed with an upper inwardly-extending contact lip 76. It will readily be appreciated in reference to FIG. 2 that the compression collar 74 can be manipulated to a first position, wherein the contact lip 76 of the compression collar 74 is distanced from the compression ring 72. When the compression collar 74 is in the first position, the compression ring 72 assumes the slide configuration. Thereby, manually reciprocating the upstream segment 50 within the well casing 16 is facilitated. As recognized by the present invention, the compression fitting 34 thus advantageously permits such positioning as might be necessary to accommodate landfill 12 shifting.

Furthermore, the compression collar 74 can be manipulated to a second position, wherein the contact lip 76 of the compression collar urges against the compression ring 72. The cooperation of structure between the compression collar 74 and seating surface 70 urge the compression ring 72 into the grip configuration, to thereby hold the upstream segment 50 stationary relative to the well casing 16.

Now considering the details of the metering coupling 36, as shown in FIG. 2 the metering coupling 36 includes a unitarily-molded single piece coupling, preferably made of PVC or HDPE. It includes a cylindrical upstream receptacle 78 defining an upstream opening 80, and a cylindrical downstream receptacle 82 defining a downstream opening 84. A fluid passageway 86 extends between the openings 80, 84, and an annular ridge 87 circumscribes the passageway 86 intermediate the openings 80, 84.

FIG. 2 shows that a disc-shaped orifice plate 88 is positioned in the fluid passageway 86 intermediate the openings 80, 84, and the respective receptacles 78, 82. The upstream pipe segment 50 is surroundingly engaged by the upstream receptacle 78 and extends substantially from the orifice plate 88 to beyond the upstream opening 80. Likewise, the downstream pipe segment 48 is surroundingly engaged by the downstream receptacle 82 and extends substantially from the orifice plate 88 to beyond the downstream opening 84. Preferably, the pipe segments 48, 50 are adhesively bonded to their respective receptacles.

In accordance with the present invention, the orifice plate 88 is formed with an orifice 90. As shown in FIG. 2, the orifice 90 may not be concentric with the orifice plate 88, but can be formed off-center (eccentric) relative to the plate 88. Stated differently, the center of the orifice 90 can be spaced from the center of the orifice plate 88, although concentric orifices and orifice plates can be used.

Figure 3:
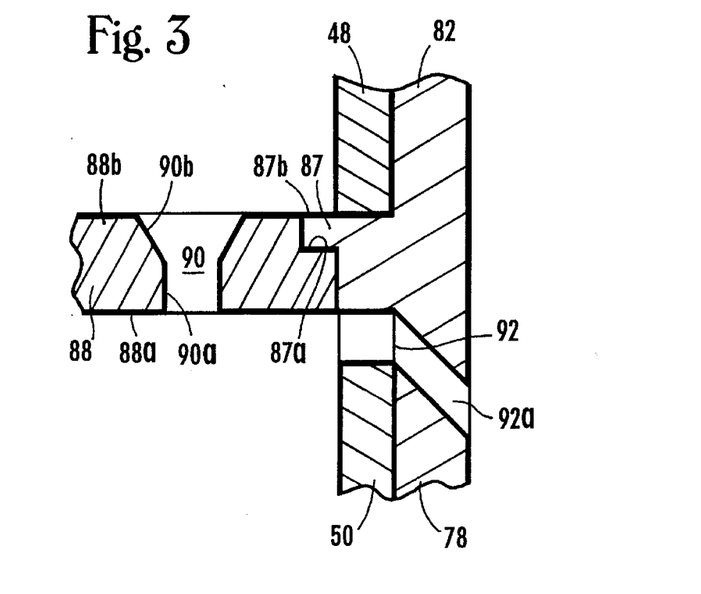
FIG. 3 is a detailed view of the orifice and upstream pressure port, as indicated by the circle 3 in FIG. 2.

As best shown in FIG. 3, the orifice plate 88 defines an upstream face 88a and a downstream face 88b. Likewise, the ridge 87 defines an upstream face 87a and a downstream face 87b. As shown, the upstream and downstream faces 88a, 88b of the orifice plate 88 are oriented in the same direction of fluid flow as the upstream and downstream faces 87a, 87b of the ridge 87. As further shown in FIG. 3, the orifice plate 88 is positioned in the fluid passageway 86 against the ridge 87.

In accordance with the present invention, one of the faces of the orifice plate 88 is stepped adjacent the periphery of the face to mate with the ridge 87 and thereby present an uninterrupted plane to fluid flow upstream and downstream of the orifice plate 88, to facilitate smooth fluid flow. More specifically, the orifice plate 88 is configured such that one of the faces of the orifice plate 88 (in the embodiment shown, the downstream face 88b) does not extend completely across the passageway 86, but instead is stepped such that it is co-planar with and contiguous to the corresponding face (downstream face 87b) of the ridge 87. In contrast, the opposite face (in the embodiment show, the upstream face 88a) of the orifice plate 88 extends completely across the passageway 86 and thus completely radially overlaps the ridge 87.

It is to be understood that with the combination of structure shown in FIG. 3, a flat planar surface is presented completely across the passageway 86 both upstream and downstream of the orifice plate 88. The present invention is thus in contrast to, e.g., the above-mentioned '006 patent, in which the ridge of the coupling overlaps the orifice plate to present an interrupted surface to fluid flow and consequently to cause turbulence and concomitant reduced flow rate measurement accuracy. Moreover, the present orifice plate 88 fits snugly onto the ridge 87, with the stepped configuration facilitating bonding when adhesive is applied between the plate 88 and ridge 87. Still further, the present orifice plate 88 facilitates the close juxtaposition of the pressure ports as described below.

Continuing to consider FIG. 3, the orifice 90 includes an upstream section 90a that has a cylindrical wall as shown. Also, the orifice 90 has a downstream section 90b that is contiguous to and coaxial with the upstream section 90a. In contrast to the upstream section 90a, however, the downstream section 90b is characterized by a frusto-conical wall which is flared outwardly away from the upstream section 90a.

In cross-reference to FIGS. 2 and 3, to facilitate sensing pressure on the upstream and downstream sides of the orifice plate 88 (and, hence, to determine gas flow rate through the metering pipe 32), upstream and downstream pressure ports 92, 94 are respectively formed in the metering coupling 36. Preferably, each pressure port 92, 94 has a diameter of about one sixteenth of an inch to one quarter of an inch (1/16"–1/4"). Importantly, the pressure ports 92, 94 are closely juxtaposed with the orifice plate 88. Per the present invention, the upstream port 92 is formed in the upstream receptacle 78 at a location that is radially adjacent the orifice 90 with respect to the metering pipe 32. On the other hand, the downstream port 94 is formed on the downstream receptacle 82 at a point that is radially distanced from the orifice 90.

Taking the upstream pressure port 92 shown in FIG. 3 as an example, the pressure port 92 includes a respective pressure channel 92a that is formed in the respective receptacle 78. The channel 92a defines an oblique angle with respect to the axis of the metering coupling 36. More particularly, the channel 92a is oriented radially inwardly toward the axis of the metering pipe 32, upstream to downstream. It is to be understood that the downstream pressure port channel 94a is likewise oriented.

Upstream and downstream hollow pressure sensor connectors 96, 98 are engaged with the coupling 36 in fluid communication with the fluid passageway 86 upstream and downstream, respectively, of the orifice plate 88. In one presently preferred embodiment, the sensor connectors 96, 98 are threadably engaged with the channels 92a, 94a. Each sensor connector 96, 98 is respectively engaged with a pressure sensor 100, 102, with the sensors 100, 102 being associated with a flow meter for providing an indication of gas flow rate through the orifice 90 (and, hence, through the metering pipe 32 and well casing 16) by means well-established in the art. If desired, an elbow 106 with connector pipe 108 can interconnect the downstream segment 48 with the flow control valve 38 and lateral pipe network 44.

It may now be appreciated that owing to the above-described combination of structure, the pressure ports of the present invention need not be distanced from the orifice plate 88. Instead, the ports 92, 94 are closely juxtaposed with the orifice plate 88 and are integrated into the coupling 36, resulting in a compact structure that establishes the present flow metering function, without deleterious measurement effects due to flow turbulence arising. In other words, the present cooperation of structure avoids the need to distance the pressure ports from the orifice to ensure accurate flow measurement, thereby integrating the flow metering function in a single, easily accessible, above-ground metering coupling that does not require pressure line feed-throughs in a well casing bushing or extensively long upstream and downstream piping to reduce flow turbulence.

Furthermore, the pressure sensors 96, 98 are easily accessed for maintenance. Also, owing to the oblique channels 92a, 94a of the present pressure ports, forming the ports 92, 94 immediately next to the orifice plate 88 is facilitate. And, the axes of the pressure sensor connectors 96, 98 are oriented downstream. Consequently, the likelihood that matter inside the metering pipe 32 will foul the sensor connectors 96, 98 is reduced.

Figure 4:
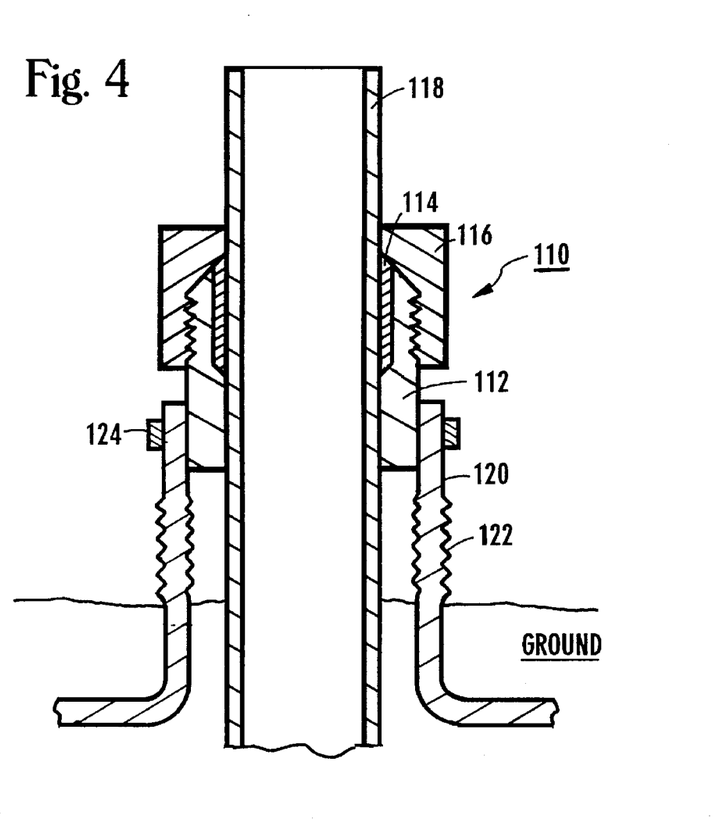
FIG. 4 is a cross-sectional view of a compression fitting shown holding a flexible membrane onto a well casing.

Now referring to FIG. 4, a compression fitting, generally designated 110, includes a compression pipe 112, a compression ring 114, and a compression collar 116 that are in all substantial respects identical in construction and operation to the pipe 68, ring 72, and collar 74 shown in FIG. 2. As shown in FIG. 4, however, the compression fitting 110 can be engaged with a well casing 118 to secure a surface-sealing flexible membrane 120 having an accordion segment 122 to the well casing 118. More specifically, the membrane 120 can be attached to the outer surface of the compression pipe 112 by gluing the membrane 120 to the pipe 112 and then positioning a clamp 124 around the membrane 120 and pipe 112. Then, as the ground (and, hence, membrane 120) settles relative to the well casing 118, the fitting 110 can be moved as appropriate up and down on the well casing 118 to sealingly hold the membrane 120 and well casing 118 together.

While the particular FLOW METERING DEVICE FOR LANDFILL GAS EXTRACTION WELL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A metering pipe system positionable in fluid communication with a well in a landfill for determining gas flow rate through the well, comprising:

an upstream pipe segment;

a downstream pipe segment oriented coaxially with the upstream pipe segment;

a metering coupling defining an upstream opening, a downstream opening, a fluid passageway extending therebetween, and a ridge circumscribing the fluid passageway, the ridge defining a first face and a second face;

an orifice plate formed with an orifice and defining a first face and a second face respectively oriented in the same direction of fluid flow as the first and second faces of the ridge, the orifice plate being positioned in the fluid passageway against the ridge and configured such that the first face of the orifice plate is co-planar with the first face of the ridge, wherein the upstream pipe segment is surroundingly engaged by the coupling and extends substantially from the orifice plate to beyond the upstream opening, and wherein the downstream pipe segment is surroundingly engaged by the coupling and extends substantially from the orifice plate to beyond the downstream opening, such that fluid in the upstream pipe segment can pass thru the orifice to the downstream pipe segment; and upstream and downstream pressure sensors positioned externally to the coupling in fluid communication with the fluid passageway upstream and downstream, respectively, of the orifice plate.

2. The system of claim 1, wherein:

an upstream pressure port is formed between the upstream pressure sensor and the fluid passageway upstream of the orifice plate, the upstream pressure port being closely juxtaposed to the orifice plate; and wherein a downstream pressure port is formed between the downstream pressure sensor and the fluid passageway downstream of the orifice plate, the downstream pressure port being closely juxtaposed to the orifice plate.

3. The system of claim 2, wherein the coupling defines an axis, and wherein each pressure port includes a respective pressure channel formed in the coupling and defining an oblique angle with respect to the axis.

4. The system of claim 2, wherein the orifice includes an upstream section having a cylindrical wall and a downstream section contiguous to the upstream section and having a frusto-conical wall flared outwardly from the upstream section.

5. The system of claim 2, further comprising a compression fitting for selectively holding the metering pipe stationary relative to the well.

6. The system of claim 5, wherein the well includes a well casing, and the compression fitting comprises:

a base stationarily connected to the well casing, the base defining a seating surface;

a resilient compression ring positioned against the seating surface in a surrounding relationship with the metering pipe, the compression ring being biased to a slide configuration, wherein the compression ring substantially does not hold the metering pipe and the metering pipe can be reciprocated relative to the well casing, the compression ring being deformable to a grip configuration, wherein the compression ring is urged against the metering pipe to substantially prevent relative motion between the metering pipe and the well casing; and a compression collar movably engaged with the base between a first position, wherein the compression collar is distanced from the compression ring, and a second position, wherein the compression collar urges the compression ring into the grip configuration.

7. The system of claim 6, wherein the base includes:

a hollow bushing defining a channel; and a compression pipe bonded to the bushing in the channel, the compression pipe being externally threaded, wherein the compression collar is internally threaded for threadably engaging the compression pipe.

8. The system of claim 2, further comprising a blower and a plurality of wells in fluid communication with the blower for extracting gas from the landfill.

9. A pipe assembly apparatus for fluid flow metering of a landfill having a coupling for joining first and second pipe segments of a first pipe and a second pipe coaxially aligned with each other, comprising:

a first cylindrical receptacle for receiving the first segment therein;

a second cylindrical receptacle for receiving the second segment therein, the first and second receptacles being coaxially opposed to each other;

a ridge formed between the receptacles;

an orifice plate abutting the ridge defining an orifice therethrough, such that fluid in the first pipe can pass through the orifice to the second pipe;

a first pressure sensor channel formed through the first receptacle and closely juxtaposed with the orifice plate; and a second pressure sensor channel formed through the second receptacle and closely juxtaposed with the orifice plate.

10. The coupling of claim 9, wherein the receptacles define an axis, with each pressure sensor channel defining an oblique angle with respect to the axis, and wherein the orifice includes an upstream section having a cylindrical wall and a downstream section contiguous to the upstream section and having a frusto-conical wall flared outwardly from the upstream section.

11. The coupling of claim 10, wherein the well includes a well casing, the first and second segments establish a metering pipe, and the coupling is further in combination with the metering pipe and a compression fitting for selectively holding the metering pipe stationary relative to the well casing, the compression fitting comprising:

a hollow bushing defining a channel, the bushing being stationarily connected to the well casing;

a compression pipe bonded to the bushing in the channel, the compression pipe defining a seating surface;

a resilient compression ring positioned against the seating surface in a surrounding relationship with the metering pipe, the compression ring being biased to a slide configuration, wherein the compression ring substantially does not contact the metering pipe and the metering pipe can be reciprocated relative to the well casing, the compression ring being deformable to a grip configuration, wherein the compression ring is urged against the metering pipe to substantially prevent relative motion between the metering pipe and the well casing; and     a compression collar threadably engaged with the compression pipe between a first position, wherein the compression collar is distanced from the compression ring, and a second position, wherein the compression collar urges the compression ring into the grip configuration.

12. The combination of claim 11, further in combination with a blower and a plurality of wells in fluid communication with the blower for extracting gas from the landfill.

13. A Landfill Apparatus for collecting gas of a landfill while measuring the flow rate of the gas being collected comprising:

a blower for generating a negative pressure gradient;

a plurality of well casings for drawing gas from a plurality of localized areas in the ground to the surface;

a network of lateral pipes for connecting the well casings to the blower, thereby collecting gas from the well casings using the negative pressure gradient of the blower; and     for each well casing, a metering system for monitoring the flow rate in the well casing, comprising         a metering pipe extending along at least part of its length within the well casing, the metering pipe including an orifice plate wherein said first pressure sensor channel is configured for fluid communication connection with a first pressure sensor disposed therein, the orifice plate defining an orifice,         first and second pressure sensors for sensing pressure at first and second points of the metering pipe, the points being located on opposite sides of the orifice plate wherein said second pressure sensor channel is configured for fluid communication connection with a second pressure sensor and closely juxtaposed therewith.

14. The apparatus of claim 13, wherein each metering system respectively further comprises:

a metering coupling defining an axis and an orifice and engaged with metering pipe, the metering coupling being formed with first and second pressure channels respectively as disposed on opposite sides of said orifice for establishing fluid communication between the metering pipe and the first and second pressure sensors, each channel defining an oblique angle with respect to the metering pipe, and wherein the orifice includes an upstream section having a cylindrical wall and a downstream section contiguous to the upstream section and having a frusto-conical wall flared outwardly from the upstream section.

15. The apparatus of claim 14, wherein each metering system respectively further comprises:

a hollow bushing defining a channel, the bushing being stationarily connected to the well casing;

a compression pipe bonded to the bushing in the channel, the compression pipe defining a seating surface;

a resilient compression ring positioned against the seating surface in a surrounding relationship with the metering pipe, the compression ring being biased to a slide configuration, wherein the compression ring substantially does not hold the metering pipe and the metering pipe can be reciprocated relative to the well casing, the compression ring being deformable to a grip configuration, wherein the compression ring is urged against the metering pipe to substantially prevent relative motion between the metering pipe and the well casing; and     a compression collar threadably engaged with the compression pipe between a first position, wherein the compression collar is distanced from the compression ring, and a second position, wherein the compression collar urges the compression ring into the grip configuration.

16. A compression fitting for selectively holding a landfill component stationary relative to a well casing in a landfill, comprising:

a base engaged with well casing, the base defining a seating surface;

a resilient compression ring positioned against the seating surface in a surrounding relationship with the landfill component, the compression ring being biased to a slide configuration, wherein the compression ring substantially does not contact the landfill component and the landfill component can be reciprocated relative to the well casing, the compression ring being deformable to a grip configuration, wherein the compression ring is urged against the landfill component to substantially prevent relative motion between the component and the well casing; and     a compression collar movably engaged with the base between a first position, wherein the compression collar is distanced from the compression ring, and a second position, wherein the compression collar urges the compression ring into the grip configuration.

17. The compression fitting of claim 16, wherein the base includes:

a hollow bushing defining a channel; and a compression pipe bonded to the bushing in the channel, the compression pipe being externally threaded, wherein the compression collar is internally threaded for threadably engaging the compression pipe.

18. The compression fitting of claim 17, wherein the component is a metering pipe and the fitting is further in combination with the metering pipe, wherein the metering pipe comprises:

an upstream pipe segment;

a downstream pipe segment oriented coaxially with the upstream pipe segment;

a metering coupling defining an upstream opening, a downstream opening, and a fluid passageway extending therebetween, the metering coupling including an orifice plate defining an orifice therethrough, the orifice plate being disposed in the fluid passageway between the upstream and downstream openings, wherein the upstream pipe segment is surroundingly engaged by the coupling and extends substantially from the orifice plate to beyond the upstream opening, and wherein the downstream pipe segment is surroundingly engaged by the coupling and extends substantially from the orifice plate to beyond the downstream opening; and upstream and downstream pressure sensors positioned externally to the coupling in fluid communication with the fluid passageway upstream and downstream, respectively, of the orifice plate.

19. The combination of claim 18, wherein:

an upstream pressure port is formed between the upstream pressure sensor and the fluid passageway upstream of the orifice plate, the upstream pressure port being closely juxtaposed to the orifice plate; and wherein a downstream pressure port is formed between the downstream pressure sensor and the fluid passageway downstream of the orifice plate, the downstream pressure port being closely juxtaposed to the orifice plate.

20. The combination of claim 19, wherein the coupling defines an axis, and wherein each pressure port includes a respective pressure channel formed in the coupling and defining an oblique angle with respect to the axis, and further wherein the orifice includes an upstream section having a cylindrical wall and a downstream section contiguous to the upstream section and having a frusto-conical wall flared outwardly from the upstream section.

* * * * *